US009649731B2

(12) United States Patent
Condell

(10) Patent No.: US 9,649,731 B2
(45) Date of Patent: May 16, 2017

(54) PIPE FABRICATION APPARATUS WITH A BED AND A SUPPORT HAVING A BACKING PLATE

(71) Applicant: CONDELL ENGINEERING LIMITED, Athy, County Kildare (IE)

(72) Inventor: Cyril Condell, Athy (IE)

(73) Assignee: CONDELL ENGINEERING LIMITED, Athy (IE)

( * ) Notice: Subject to any disclaimer, the term of this patent is extended or adjusted under 35 U.S.C. 154(b) by 364 days.

(21) Appl. No.: 14/346,515

(22) PCT Filed: Apr. 26, 2013

(86) PCT No.: PCT/EP2013/058723
§ 371 (c)(1),
(2) Date: Jun. 24, 2014

(87) PCT Pub. No.: WO2013/164264
PCT Pub. Date: Nov. 7, 2013

(65) Prior Publication Data
US 2014/0353281 A1    Dec. 4, 2014

(30) Foreign Application Priority Data

Apr. 30, 2012  (IE) .................................. S2012/0215
Dec. 11, 2012  (IE) .................................. S2012/0529

(51) Int. Cl.
*B21J 13/08*     (2006.01)
*B23K 37/053*    (2006.01)

(52) U.S. Cl.
CPC ........ *B23K 37/053* (2013.01); *B23K 37/0533* (2013.01); *B23K 37/0536* (2013.01)

(58) Field of Classification Search
CPC .............. B23K 37/053; B23K 37/0533; B23K 37/0536
(Continued)

(56) References Cited

U.S. PATENT DOCUMENTS 3,772,753 A * 11/1973 Sargeant .............. B23K 9/0282
                                              228/48
4,570,842 A *  2/1986 Gregorious ........ B23K 37/0538
                                              228/48
(Continued)

FOREIGN PATENT DOCUMENTS

CA       2523251 A1   4/2006
JP    S53121124 U     9/1978
(Continued)

OTHER PUBLICATIONS

International Search Report for corresponding International Application No. PCT/EP2013/058723.

*Primary Examiner* — Thien S Tran
(74) *Attorney, Agent, or Firm* — Egbert Law Offices, PLLC

(57) ABSTRACT

A pipe fabrication apparatus includes a fabrication module having a guide adapted to support a cylindrical component, at or adjacent a first end of the component, at two discrete and space apart locations on an exterior surface of the component, and a bed for supporting the cylindrical component at a position distal the first end such that a longitudinal axis of the component is aligned with a central axis of the fabrication module in order to allow additional cylindrical parts to be quickly and easily coaxially aligned with the component for the purposes of tack welding the two items together prior to full seam welding.

19 Claims, 9 Drawing Sheets

(58) Field of Classification Search
USPC ......... 219/59.1, 80, 159, 161; 269/9, 43, 45, 269/55, 130, 243
See application file for complete search history.

(56) References Cited

U.S. PATENT DOCUMENTS 4,667,548 A * 5/1987 Astle ...................... B23B 5/165
269/152
6,161,296 A 12/2000 Davio

FOREIGN PATENT DOCUMENTS

| JP | S60145288 A | 7/1985 |
|---|---|---|
| JP | H08174282 A | 7/1996 |
| JP | 2001079662 A | 3/2001 |
| JP | 2001129688 A | 5/2001 |

* cited by examiner

PIPE FABRICATION APPARATUS WITH A BED AND A SUPPORT HAVING A BACKING PLATE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention relates to a pipe fabrication apparatus, and in particular an apparatus that facilitates the quick and accurate alignment of sections of pipe and/or other cylindrical fittings for tacking prior to welding.

2. Description of Related Art Including Information Disclosed Under 37 CFR 1.97 and 37 CFR 1.98

At present, the mechanical construction of pipe or similar cylindrical assemblies, for example as used in above ground gas stations, water/fuel pumping stations, steam and water supplies for electrical power stations, etc. primarily involve the following key stages:

1. Preparation of isometric drawings.
2. Cutting of specific pipe lengths.
3. Welding preparation of cut pipe (spools).
4. Fitting and tacking prior to welding.
5. Welding of spools to fittings and valves (etc.).
6. Final assembly.
7. Pressure Testing of the System.

Of the above the most costly and labour intensive stages are no.'s 4 and 5. However in recent years there have been technological advances in welding which are continually making it more cost and labour effective.

It is therefore an object of the present invention to advance the fitting and tacking operations in order to considerably reduce cost and time.

BRIEF SUMMARY OF THE INVENTION

According to the present invention there is provided a pipe fabrication apparatus comprising a support comprising a backing plate, a guide projecting from the backing plate for supporting a first end of a cylindrical component, against the backing plate, at two or more discrete and spaced apart locations on an exterior surface of the component, and a bed for supporting the cylindrical component at a position distal the first end.

Preferably, the guide is adapted to allow the position of the two or more discrete locations to be varied to accommodate cylindrical components of different diameter.

Preferably, at least a pair of the discrete locations are disposed, in use, in substantially the same horizontal plane and at an equal distance on opposed sides of a centreline of the support.

Preferably, the guide comprises a tapered channel for supporting the first end of the cylindrical component.

Preferably, the tapered channel has a physical or virtual apex which is located on a centreline of the support.

Preferably, the support comprises a first leg on which the backing plate is mounted, and a second leg on which the bed is mounted, the first and second legs extending perpendicularly to one another.

Preferably, the backing plate is mounted for sliding adjustment axially along the first leg.

Preferably, the bed is mounted for sliding adjustment axially along the second leg.

Preferably, the support comprises at least one secondary support mounted on the second leg and comprising a tapered seat for receiving a sidewall of the cylindrical component for supporting the cylindrical component at a position distal the first end.

Preferably, the at least one secondary support is mounted for sliding adjustment axially along the second leg.

Preferably, the support is hingedly mounted to a base.

Preferably, the support is hingedly mounted such that the angular orientation of the backing plate relative to the bed remains fixed regardless of the angle at which the support is disposed.

Preferably, the base is height adjustable.

Preferably, the backing plate comprises a restraint engageable, in use, with the cylindrical component such as to restrain the component in face to face engagement with the backing plate.

Preferably, the restraint comprises a pair of arms pivotally mounted for rotation in a plane parallel and in spaced relationship to the backing plate.

Preferably, the pair of arms are pivotally mounted to the guide.

Preferably, the position of a pivot mounting of each arm is adjustable along the guide.

Preferably, each arm comprises a finger at a free end thereof.

Preferably, the apparatus comprises a first actuator operable to adjust the position of the backing plate along the first leg.

Preferably, the apparatus comprises a second actuator operable to alter the height of the base.

Preferably, the apparatus comprises a third actuator operable to hinge or tilt the bed relative to the base.

BRIEF DESCRIPTION OF THE DRAWINGS

The present invention will now be described with reference to the accompanying drawings, in which.

DETAILED DESCRIPTION OF THE INVENTION

Figure 1:
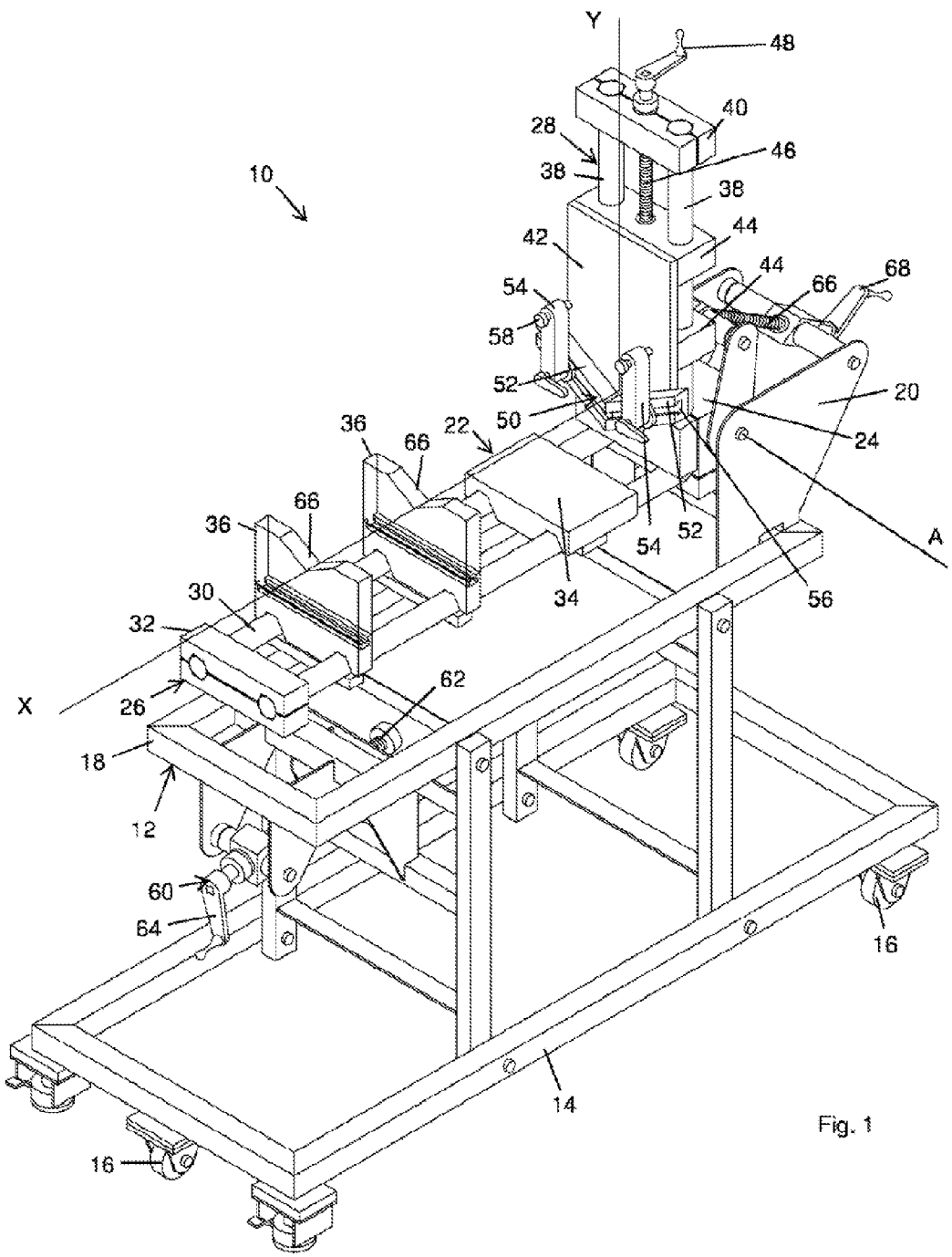
FIG. 1 illustrates a perspective view of a pipe fabrication apparatus according to an embodiment of the present invention.
Figure 2:
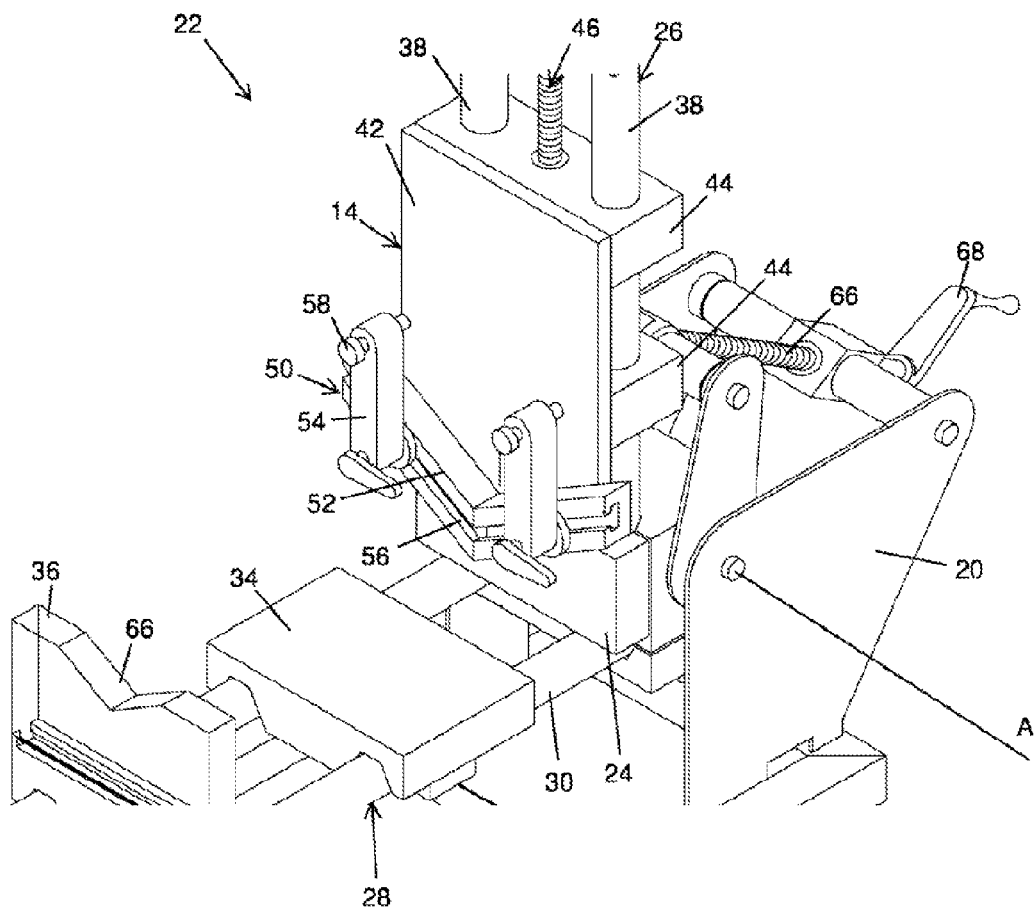
FIG. 2 illustrates an enlarged view of a portion of the pipe fabrication apparatus illustrated in FIG. 1.
Figure 3:
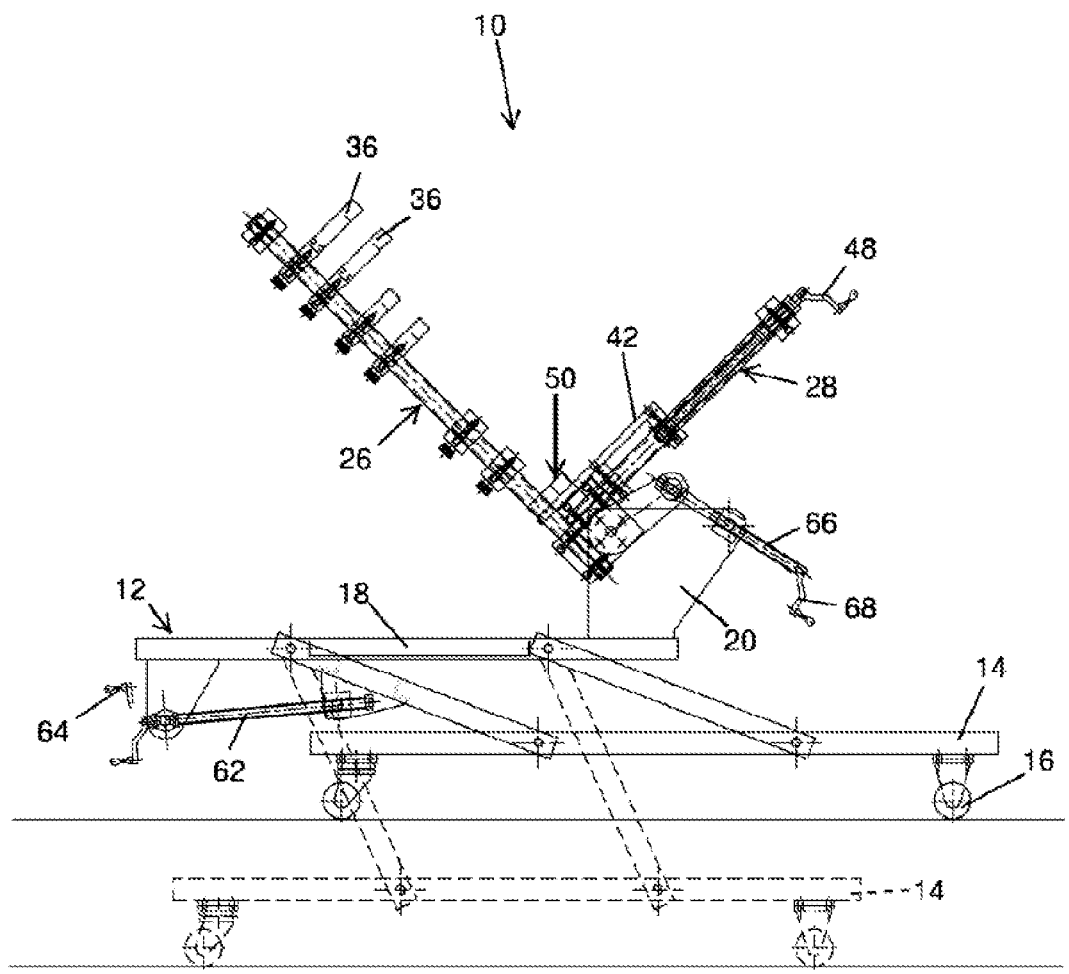
FIG. 3 illustrates a side elevation of the pipe fabrication apparatus of FIGS. 1 and 2 when tilted into a reclined position for receiving pipe sections thereon.

Referring now to FIGS. 1 to 3 of the accompanying drawings there is illustrated an embodiment of a pipe fabrication apparatus, generally indicated as 10, which is designed to reduce the time taken, and increase the accuracy of, the assembly of multiple pipe sections (spools) and/or fittings to one another, for example fitting a radius or elbowed pipe section (not shown) to a straight length of pipe or spool (not shown). The apparatus 10 allows the various sections to be aligned with significant speed and accuracy, so that the multiple sections of the pipe assembly can be tacked together while in position on the apparatus 10, for ease of welding once removed, thus allowing the final assembly to be fully welded while reducing distortion and increasing accuracy.

The apparatus 10 comprises a base 12 which comprises a lower frame 14 mounted on a plurality of castors 16 or other suitable wheels, enabling the base 12 to be moved as required, and an upper frame 18 whose position relative to the lower frame 14 can be adjusted, as will be described hereafter, in order to alter the height of the base 12.

Mounted to one end of the upper frame 18 is a coupling in the form of a pair of plates 20, to which a support in the form of a fabrication module 22 is hingedly mounted about, in use, a horizontal axis A. The fabrication module 22 comprises a body 24 that is hingedly mounted to the plates 20, and from which extends a cantilevered first leg 26 and a cantilevered second leg 28 arranged perpendicularly to the first leg 26. The first leg 26, in the embodiment illustrated, comprises a pair of parallel first columns 30 which may for example be solid tubular steel or the like, and which are connected together at the free or cantilevered end by an end block 32.

Mounted to and slidable along the first leg 26 is a bed 34, which is positioned adjacent the body 24 and which may be slid towards and away from the body 24 in order to suit the particular pipe section being fabricated, as is described hereinafter in detail.

A pair of V-blocks 36 is also mounted to the first leg 26, outward of the bed 34 relative to the body 24. Each of the V-blocks 36 is again slidably mounted on the pair of first columns 30, in order to allow their positions to be adjusted as required. The exact configuration and operation of the V blocks 36 will be described in detail hereinafter.

Turning then to the second leg 26, there is provided a pair of parallel second columns 38 again formed from solid tubular steel or the like, and secured together at the free or cantilevered end by an end block 40. Mounted to and slidable along the pair of second columns 38 is a backing plate 42. The backing plate 42 is secured to a pair of backing blocks 44 through which the pair of second columns 38 pass, such that the backing blocks 44 can slide axially along the second columns 38, with the backing plate 42 thus moving therewith. In order to allow the position of the backing plate 42 to be adjusted a first actuator in the form of a threaded shaft 46 is provided between the end block 40 and the backing blocks 44, and is operable by a handle 48 mounted to the end block 40. Rotation of the handle 48 in one or other direction will thus affect displacement of the backing blocks 44 and backing plate 42 along the second leg 28. This adjustability allows the fabrication apparatus 10 to accommodate pipe sections/fittings of various dimensions, as will be described in detail hereinafter.

Projecting outwardly from the backing plate 42 is a guide 50 located towards or at the lower end of the backing plate 42, adjacent the body 24. The guide 50 comprises a pair of arms 52 which are angled relative to one another to form a tapered or V-shaped channel or surface whose apex is positioned in line with a longitudinal axis X and a central axis Y of the apparatus 10, and in particular the fabrication module 22. The guide 50 is thus adapted to receive and support a cylindrical section of pipe, or a pipe flange or the like, against the backing plate 42 while ensuring that the axis of the cylindrical section is accurately aligned with both the longitudinal axis X and the central axis Y of the fabrication module 22.

A restraint is provided in the form of a pair of retaining arms 54 pivotally mounted to the guide 50, one on either arm 52. The retaining arms 54 are intended to hang vertically downward under gravity when not in use, and to be swung upwardly into position to be brought into register with a flange (not shown) or the like positioned on the guide 50, in order to retain same against the backing plate 42. The point at which each retaining arm 54 is hingedly mounted to the respective arm 52 may be adjusted towards and away from the apex of the guide 50, in order to allow components of varying dimension to be accommodated on the guide 50 and to be restrained by the retaining arms 54. Thus the guide 50 is provided with a T shaped slot 56 running the length thereof, and via which the pivoted end of each retaining arm 54 is secured to the guide 50. The opposed or free end of each retaining arm 54 is preferably provided with a finger 58 which projects towards the backing plate 42, and which may be spring loaded or otherwise axially adjustable relative to the respective retaining arm 54, in order to allow light pressure to be applied to the component being retained against the backing plate 42.

Turning then to the operation of the fabrication apparatus 10, a user will initially adjust the height of the base 12 such that the fabrication module 22 is at a suitable working height. This is achieved through operation of a second actuator 60 again comprising a threaded rod 62 operated by a handle 64 located at an end of the upper frame 18. The lower frame 14 and the upper frame 18 are connected together in a parallelogram type arrangement, which maybe compressed/expanded through operation of the second actuator 60, in order to allow the height of the base 12 to be adjusted, as illustrated in dotted outline in FIG. 3.

Once the height of the base 12 has been set to suit the user, the fabrication module 22 is then hinged about the axis AA through operation of a third actuator in the form of a treaded rod 66 and handle 68 to a suitable angle, for example as illustrated in the FIG. 3. The exact configuration or setup of the apparatus 10, and in particular the fabrication module 22, will then depend on the type and number of pipe sections/components to be aligned with one another for tacking.

The following description details the alignment and connection of a flanged straight section of pipe (not shown) to a straight section of pipe, otherwise known as the spool, ensuring that both sections are coaxially aligned prior to tacking The flanged section is positioned with the end face of the flange against the backing plate 42 and seated against the guide 50. Gravity will act to press the flanged section downwardly against the guide 50, whose V shaped support surface will ensure that the central axis of the flange section will be accurately aligned with the X and Y axes of the fabrication module 22. The flanged section will thus be contacted and supported by the guide 50 at two opposed discrete locations on the exterior surface of the flanged section, one location being defined on each of the arms 52. It will also be appreciated that due to the length of the arms 52 flanged sections of various diameters may be supported thereon, and the two discrete support locations will simply be closer or further together, depending on the diameter of the particular flanged or other cylindrical section or component.

In addition, as the module 22 is hinged rearward, gravity will also act to press the flange against the backing plate 42, ensuring the section of pipe extending outwardly from the flange is axially aligned with the X axis. At this point the pair of retaining arms 54 may be swung upwardly such that the fingers 58 overly the flange and press same into register with the backing plate 42. This ensures that the flanged section of pipe will remain fixed in position extending straight outwardly along the X axis of the module 22.

The section of spool to be aligned with and tacked to the flanged section of pipe is then seated on the pair of V-blocks 36, each of which is provided with a tapered or V-shaped seat 60 in the upper face thereof. The seat 60 ensures that the section of pipe supported between the V-blocks 36 is coaxially aligned with the X axis of the fabrication module 22, and will therefore be coaxially aligned with the flanged section of pipe supported against the backing plate 42. The position of the backing plate 42 along the first leg 26 may then be adjusted using the first actuator 48 until the flanged section and spool section are perfectly aligned with one another along the Y axis. At this point the two are brought into face to face engagement with one another, and tacked together. The tacked assembly may then be removed from the fabrication apparatus 10 to complete the welding process.

In the event that a radius or elbowed section of pipe is to be secured to a spool section, the radius section may be retained against the backing plate 42 as herein before described, with the radius or elbow tuning downwardly towards the second leg 28. The spool section can then be positioned with one end or face against the bed 34, and the position of the backing plate 42 along the Y axis adjusted until the two sections are brought into face to face engagement with one another. At this point the two sections can again be tacked together before being removed from the apparatus 10 for final welding.

Figure 4:
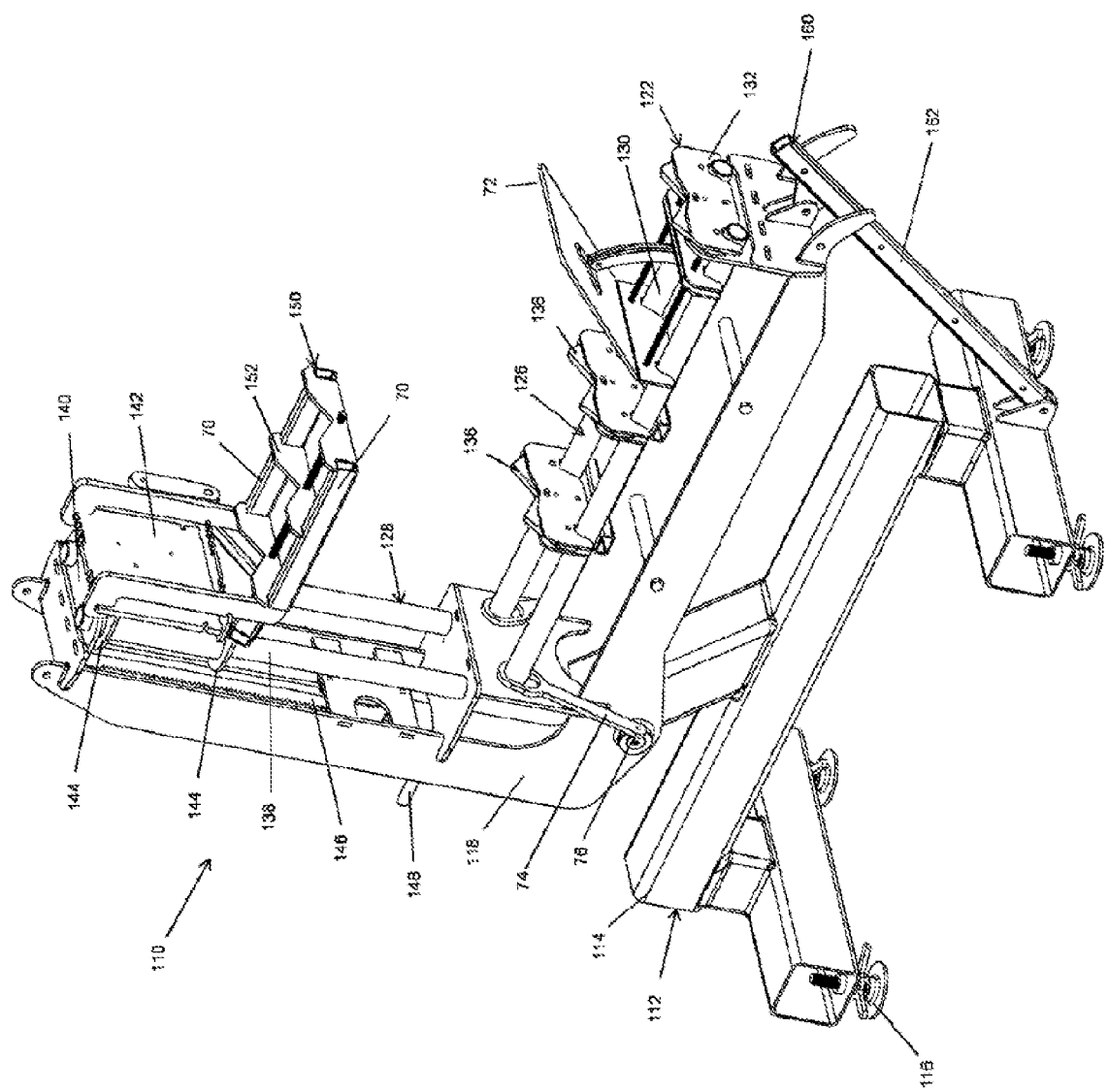
FIG. 4 illustrates a perspective view of a pipe fabrication apparatus according to the alternative embodiment of the present invention.
Figure 5:
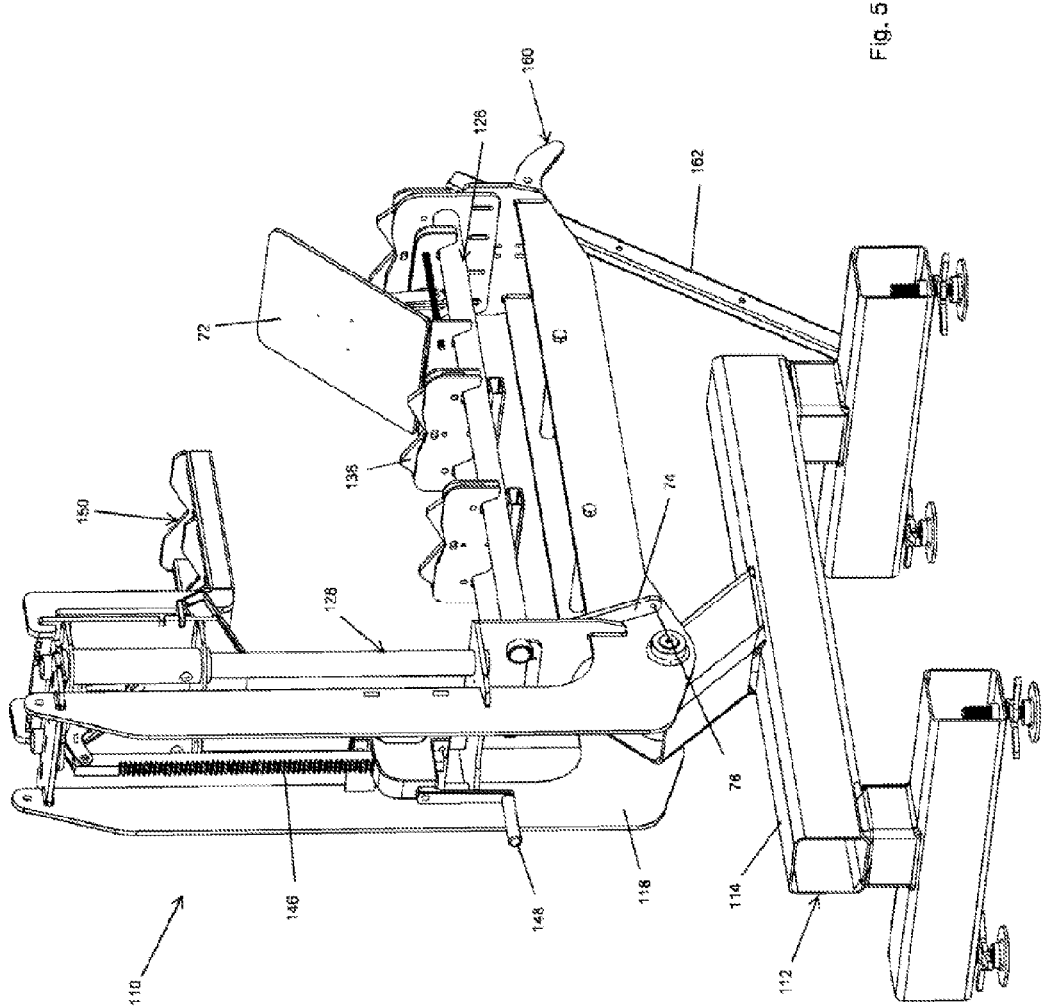
FIG. 5 illustrates an alternative perspective view of the fabrication apparatus of the invention as illustrated in FIG. 4.

Referring now to FIGS. 4 and 5 there is illustrated an alternative embodiment of a pipe fabrication apparatus, generally indicated as 110, which is again designed to improve the assembly of multiple pipe sections and/or fittings. In this alternative embodiment like components have been accorded like reference numerals and unless otherwise stated perform a like function.

The apparatus 110 comprises a base 112 having a lower frame 114 and a plurality of levelling pads 116 on which the frame 114 is mounted. The base 112 further comprises an upper frame 118 whose angular position relative to the lower frame 114 can be adjusted in order to vary the angular inclination of the upper frame 118 as described hereinafter.

Mounted to the upper frame 118 is support in the form of a fabrication module 122 comprising a first leg 126 and a second leg 128 which is arranged perpendicularly to the first leg 126. The first leg 126 comprises a pair of parallel first columns 130 which are connected together at the ends by an end block 132. A pair of v blocks 136 are slidably mounted on the first leg 126 as with the first embodiment.

Turning to the second leg 128, there is a provided a pair of parallel second columns 138 which are secured together at the free ends by an end block 140. Mounted to and slideable along the second columns 138 is a backing plate 142 which is mounted to the columns 138 by a pair of backing blocks 144. The backing blocks 144 and therefore the backing plate 142, are slideable axially along the second columns 138 and can be adjusted by means of a first actuator in the form of a rack 146 which extends parallel to the column 138 and a handle operated pinion 148 which can be used to displace the rack 146. The rack 146, is connected at an upper end, to the backing plate 142 in order to allow the backing plate 142 to move up and down along the columns 138 as the rack 146 is moved.

Projecting outwardly from the backing plate 142 is a guide 150 which comprises a pair of outwardly extending parallel legs 70 mounted to which are three sets of arms 152. The arms 152 are angled relative to one another to form a tapered or V-shaped channel whose apex is positioned along a longitudinal axis and a central axis of the apparatus 1 10, and in particular the fabrication module 122 as in the previous embodiment. The guide 150 is thus adapted to receive and support a cylindrical section of pipe, pipe flange, or the like against the backing plate 142 while ensuring that the axis of the cylindrical section is accurately aligned with both the longitudinal axis and the central axis of the fabrication module 122. In addition, as the pair of legs 70 project outwardly in a substantially horizontal direction during use, the guide 50 is capable of holding sections of pipe and/or flanges in a horizontal position, thus increasing the functionality of the guide 50.

As with the previous embodiment, the angular inclination of the fabrication module 122 may be altered by the operation of a second actuator 160 which comprises a cantilevered support 162 which extends between the lower frame 112 and the upper frame 118.

The apparatus 110 further comprises an angle plate 72 slideably mounted to the first leg 126, and whose angle can be adjusted, for example through a range of 5° to 45° to allow the mounting and support of bend sections of pipe on the fabrication module 122.

Finally, the apparatus 110 comprises a pair of levelling arms 74 that project outwardly from the columns 130 of the first leg 126, and are rotatable about the respective column 130. Each arm 74 has a pin 76 projecting outwardly from the free end thereof, and which is dimensioned to fit within any one of the holes (not shown) in the circumferential flange of a flanged pipe end (not shown). The levelling arms 74 are rotated into a substantially vertical position once a flanged pipe end is located against the backing plate 142, with each of the pins 76 then being located in opposing holes in the flange. This ensures that each pair of opposed flange holes are positioned parallel to the first leg 126. By displacing the backing plate 142 upwardly the pair of arms 74 pull/rotate the flange into a 1-hole at top or 2-hole at top orientation as desired.

Referring now to FIGS. 6 to 9 there is illustrated a further alternative embodiment of a pipe fabrication apparatus, generally indicated as 210, which is again designed to improve the assembly of multiple pipe or similar cylindrical sections and/or fittings. In this alternative embodiment like components have been accorded like reference numerals and unless otherwise stated perform a like function.

Figure 6:
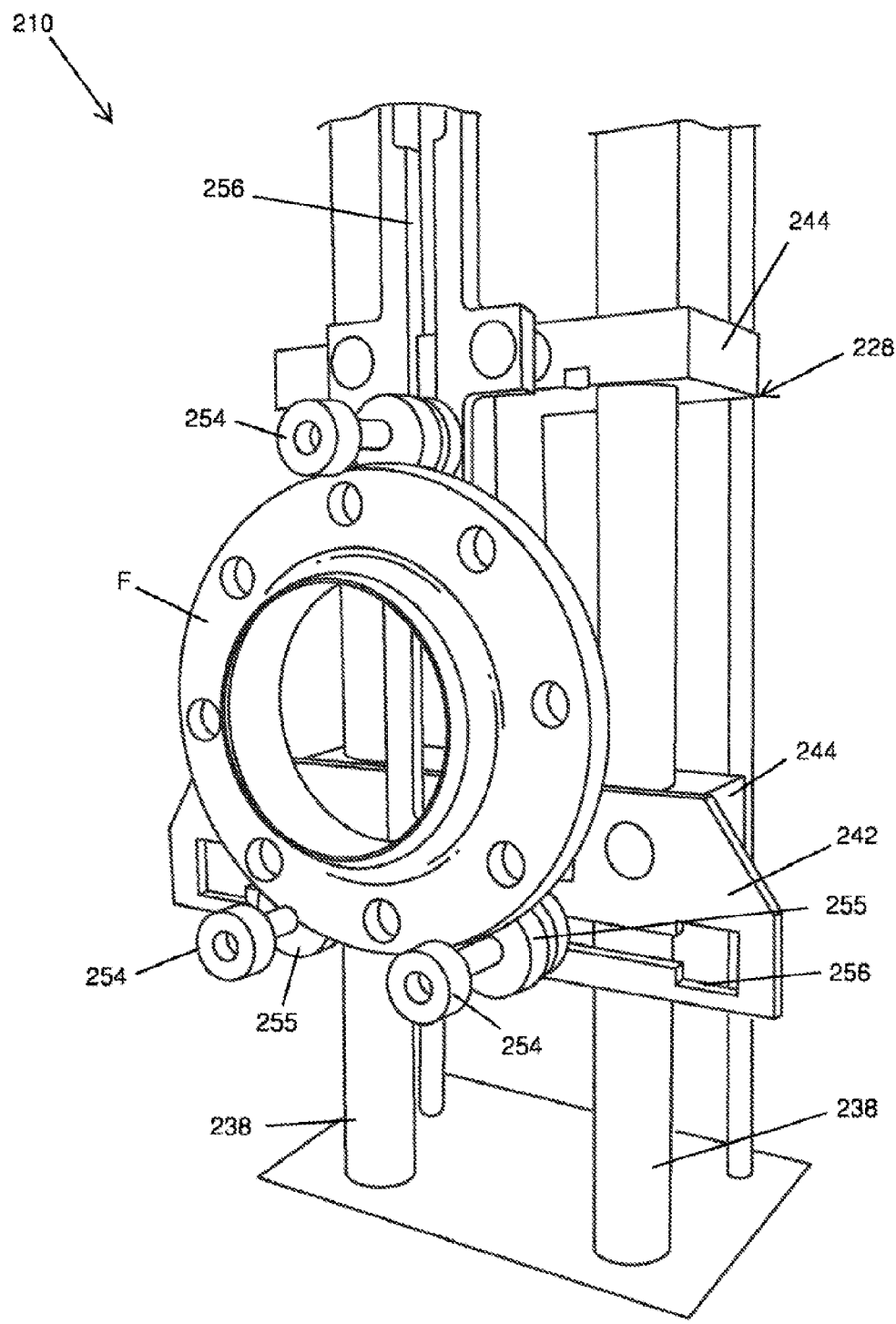
FIG. 6 illustrates a perspective view of a portion of a pipe fabrication apparatus according to a further alternative embodiment of the present invention.

The apparatus 210 comprises a base 212 on which is mounted an upper frame 218 carrying a support in the form of a fabrication module 222. The fabrication module 222 comprises a first leg 226 and a second leg 228 arranged substantially perpendicularly to one another. Referring in particular to FIG. 6 the second leg 128 comprises a pair of parallel second columns 238 mounted to and slidable along which is a backing plate 242 carried on a pair of backing blocks 244. Thus as with the previous embodiments the backing plate 242 is slidable axially along the second columns 138.

The backing plate 242 carries a guide in the form of a lower pair of retaining arms 254 which project outwardly from the backing plate 242, and a restraint in the form of a single upper retaining arm 254, which are each slidably mounted within a respective slot 256 in the backing plate 242. In this case there is a single horizontal slot 256 within which the two lower retaining arms 254 are constrained, and a perpendicular and therefore substantially vertical slot 256 within which the upper retaining arm 254 is constrained. FIG. 6 illustrates a work piece in the form of a flange F being held in position between the three retaining arms 254. The retaining arms 254 can be moved horizontally and vertically to facilitate work pieces of varying dimensions. In addition the work piece can be vertically aligned or "plumbed" using the retaining arms 254, by adjusting the position of spacers 255 located on the retaining arms 254.

The two lower retaining arms 254 thus define a pair of discrete and spaced apart locations onto which the outer surface of a cylindrical component, for example the flange F, can be located and supported, while the third or upper retaining arm 254 serves as a means of securing the component in position. By locating the two lower retaining arms 254 at equal distances on either side of a centreline of the fabrication module 222 any cylindrical work piece that is lowered into position onto the two retaining arms 254 will be automatically coaxially aligned with the centreline of the fabrication module 222, thereby allowing additional components to be aligned and fixed to the component supported on the retaining arms 254.

Figure 7:
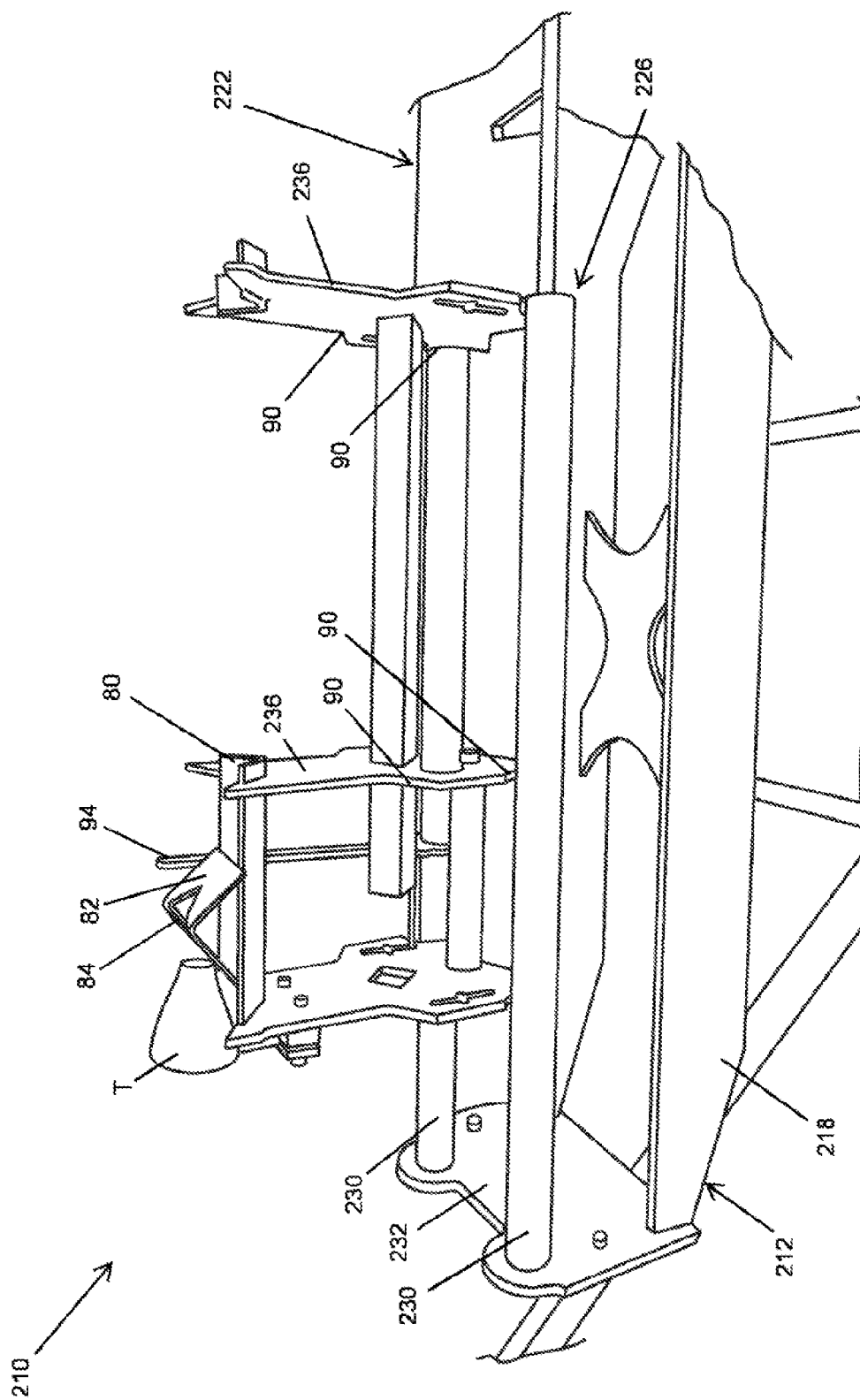
FIG. 7 illustrates a perspective view of a further portion of the pipe fabrication apparatus shown in FIG. 6.
Figure 8:
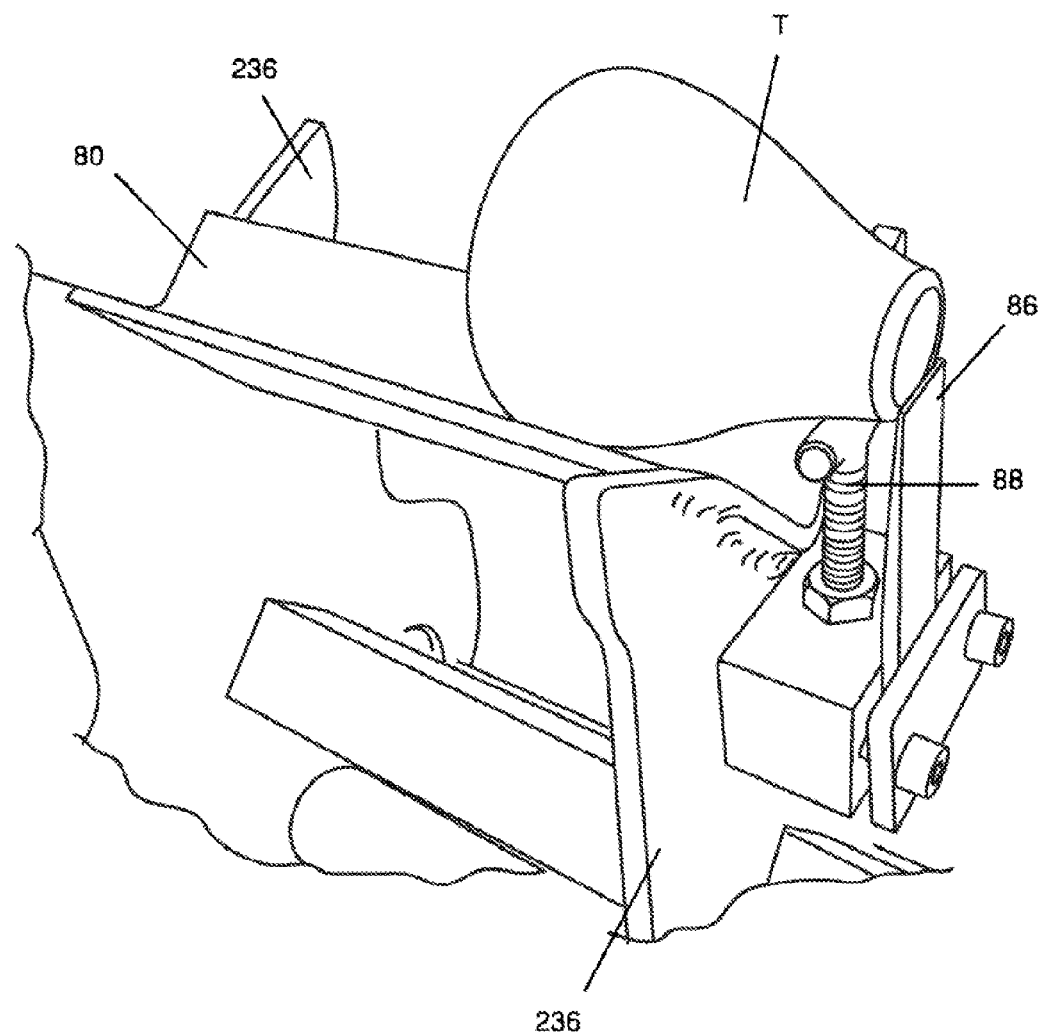
FIG. 8 illustrates an enlarged perspective view of FIG. 7.

Turning now to FIG. 7 the fabrication module 222 is shown in greater detail. The first leg 226, comprising a pair of parallel first columns 230, is shown carrying three V blocks 236 thereon. The V blocks 236 can be slid horizontally along the pair of columns 230 as required, in order to alter the distance between the V blocks 236 and the backing plate 242. The embodiment illustrated includes three of the V blocks 236, the left most pair being fixed in position relative to one another, whilst the right hand V block 236 is adjustable relative to the remaining two V blocks 236. Thus the overall length that is spanned by the three V blocks 236 can be adjusted in order to accommodate work pieces of various lengths. The left hand pair of V blocks 236 are connected to one another via a V shaped channel 80 which is adapted to hold smaller work pieces, for example a relatively small tapered pipe T illustrated in FIGS. 7 and 8. In order to accommodate such asymmetric work pieces, the apparatus 210 may further comprise a support 82 having a V shaped opening 84 therein and into which one end of the work piece T may be rested. In this way the work piece T may be oriented such that a longitudinal axis thereof is substantially parallel to the first leg 226.

In order to further secure such asymmetrically shaped work pieces the apparatus 210 comprises an adjustable abutment 86 whose height can be varied in order to act as a stop against which an end of the work piece T can be engaged such as to prevent displacement of the work piece T during fabrication processes using the apparatus 210. Provided adjacent the abutment 86 is a height adjustable arm 88 which can again be adjusted to act as a support on which the work piece T may be rested, again ensuring that a longitudinal axis of the work piece T is correctly oriented for the fabrication operation in question.

Figure 9:
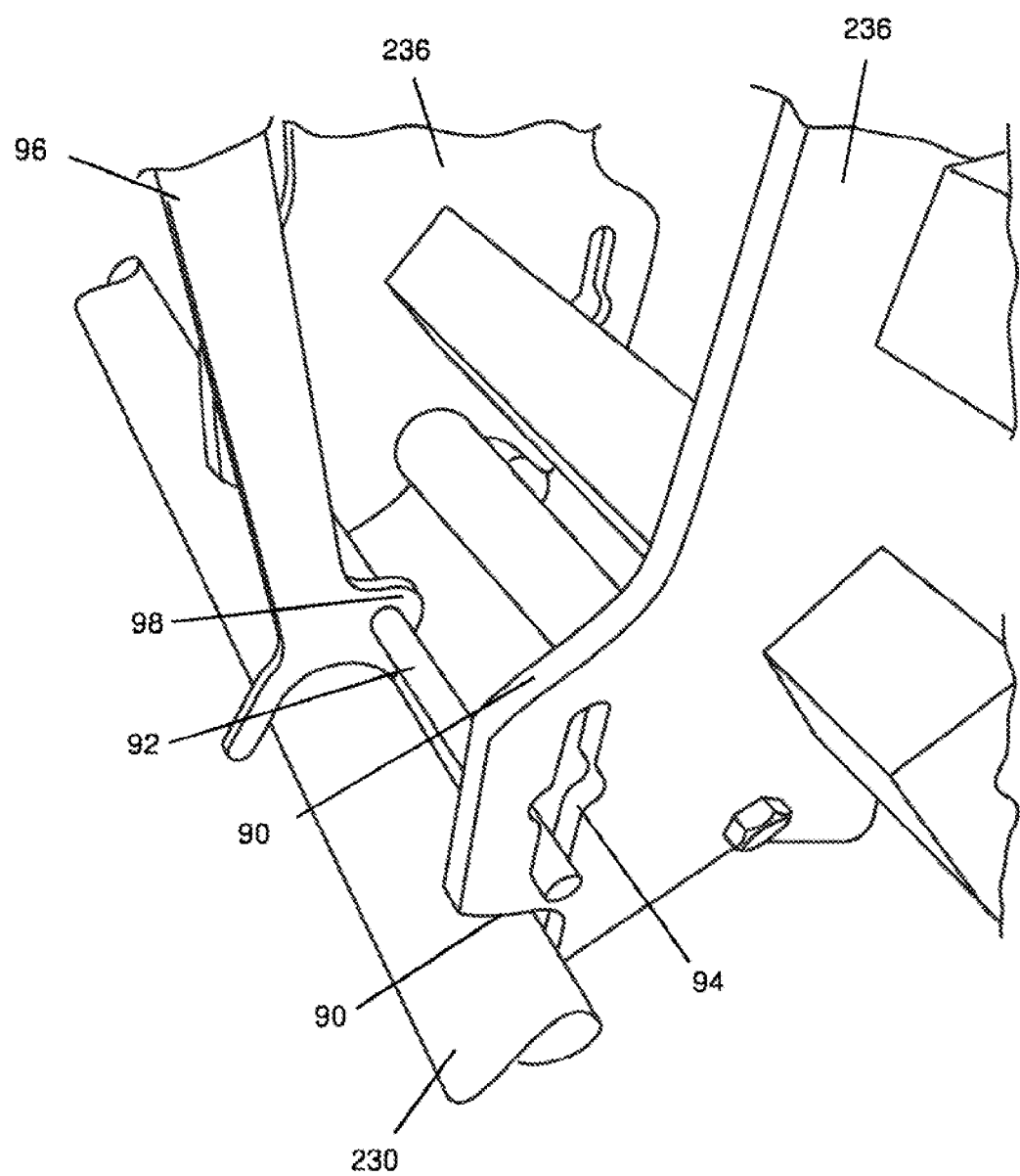
FIG. 9 illustrates an enlarged view of an additional section of the pipe fabrication apparatus shown in FIG. 7.

Referring to FIGS. 7 and 9, each of the V blocks 236 comprises a pair of shoulders 90 which in use are seated against a respect of one of the first columns 230 such that the V blocks 236 rest on and are supported by the pair of first columns 230. Each V block 236 comprises a second pair of shoulders 90 spaced from and inverted relative to the first shoulders 90, such that each of the V blocks 236 can be used at two different heights by turning each V block 236 upside down to rest on the second set of shoulders 90.

The apparatus 210 further comprises a mechanism to allow the lateral alignment of the set of V blocks 236. It can thus be seen that a connecting rod 92 extends between and through the three V blocks 236, being carried in a respective vertical slot 94 in each V block 236. The rod 92 is therefore capable of floating vertically within the slots 94. A lever 96 is mounted to the adjacent first column 230, and includes a lobe 98 through which the rod 92 passes. Thus it will be appreciated, in particular from FIG. 9, that by drawing the lever downwardly, with the first column 230 acting as a fulcrum, the rod 92 will be drawn laterally with the lever 96, thereby pulling each of the V blocks 236 laterally with it. Conversely if the lever 96 is raised upwardly the rod 92 will act to force the V blocks 236 laterally in the opposite direction. In this way lateral alignment of the V blocks 236 can be quickly and easily achieved.

The fabrication apparatus 10; 110; 210 of the present invention thus ensures the speedy and accurate alignment of multiple sections of pipe, which can then be tacked together before final welding, and can accommodate a large range of dimensions for the various sections/fittings.

The invention claimed is:

1. A pipe fabrication apparatus comprising a support comprising a backing plate, a guide projecting from the backing plate for supporting a first end of a cylindrical component, against the backing plate, at two or more discrete and spaced apart locations on an exterior surface of the component, and a bed for supporting the cylindrical component at a position distal the first end, wherein the support comprises a first leg on which the backing plate is mounted, and a second leg on which the bed is mounted, the first and second legs extending perpendicularly to one another, wherein the support comprises at least one secondary support mounted on the second leg and comprising a tapered seat for receiving a sidewall of the cylindrical component for supporting the cylindrical component at a position distal the first end.

2. The pipe fabrication apparatus of claim 1, wherein the guide is adapted to allow a position of the two or more discrete locations to be varied to accommodate cylindrical components of different diameters.

3. The pipe fabrication apparatus of claim 1 wherein at least a pair of the discrete locations are disposed, in use, in substantially a common horizontal plane and at an equal distance on opposed sides of a centerline of the support.

4. The pipe fabrication apparatus of claim 1, wherein the support comprises a tapered channel for supporting the first end of the cylindrical component.

5. The pipe fabrication apparatus of claim 4, wherein the tapered channel has a physical or virtual apex which is located on a centerline of the support.

6. The pipe fabrication apparatus of claim 1, wherein the backing plate is mounted for sliding adjustment axially along the first leg.

7. The pipe fabrication apparatus of claim 1, wherein the bed is mounted for sliding adjustment axially along the second leg.

8. The pipe fabrication apparatus of claim 1, wherein the at least one secondary support is mounted for sliding adjustment axially along the second leg.

9. The pipe fabrication apparatus of claim 1, wherein the support is hingedly mounted to a base.

10. A pipe fabrication apparatus comprising a support comprising a backing plate, a guide projecting from said backing plate for supporting a first end of a cylindrical component against said backing plate at two or more discrete and spaced apart locations on an exterior surface of the component, and a bed for supporting the cylindrical component at a position distal the first end, wherein the support is hingedly mounted such that an angular orientation of the backing plate relative to the bed remains fixed regardless of the angle at which the support is disposed.

11. The pipe fabrication apparatus of claim 10, wherein the base is height adjustable.

12. The pipe fabrication apparatus of claim 1, wherein the backing plate comprises a restraint engageable, in use, with the cylindrical component such as to restrain the component in face to face engagement with the backing plate.

13. The pipe fabrication apparatus of claim 12, wherein the restraint comprises a pair of retaining arms pivotally mounted for rotation in a plane parallel and in spaced relationship to the backing plate.

14. The pipe fabrication apparatus of claim 13, wherein the pair of retaining arms are pivotally mounted to the guide.

15. The pipe fabrication apparatus of claim 14, wherein the position of a pivot mounting of each retaining arm is adjustable along the guide.

16. The pipe fabrication apparatus of claim 13, wherein each retaining arm comprises a finger at a free end thereof.

17. The pipe fabrication apparatus of claim 10, wherein the apparatus comprises a first actuator operable to adjust a position of the backing plate along the first leg.

18. The pipe fabrication apparatus of claim 9, further comprising a second actuator operable to alter the height of the base.

19. The pipe fabrication apparatus of claim 18, further comprising a third actuator operable to hinge or tilt the bed relative to the base.

* * * * *